United States Patent [19]

Rose

[11] 4,413,462
[45] Nov. 8, 1983

[54] ACCUMULATOR AND STACKER FOR SANDWICHED BISCUITS AND THE LIKE

[75] Inventor: Edward Rose, Skokie, Ill.

[73] Assignee: Peters Machinery Co., Subsidiary of Katy Industries, Chicago, Ill.

[21] Appl. No.: 262,994

[22] Filed: May 12, 1981

[51] Int. Cl.³ .................... B65B 35/50; B65B 35/44
[52] U.S. Cl. ................................. 53/540; 198/422; 53/532
[58] Field of Search ............ 53/532, 540, 550, 155, 53/237, 474; 198/422, 420

[56] References Cited

U.S. PATENT DOCUMENTS

| | | | |
|---|---|---|---|
| 2,805,756 | 9/1957 | Fowler | 198/422 |
| 3,119,352 | 1/1964 | Fay | 198/422 X |
| 3,408,926 | 11/1968 | Rogerson | 53/540 X |
| 3,470,674 | 10/1969 | Madonia | 53/540 X |
| 3,670,665 | 6/1972 | Levi | 198/422 X |
| 3,719,019 | 3/1973 | Albrecht et al. | 53/540 |
| 4,307,800 | 12/1981 | Joa | 198/422 |

Primary Examiner—James F. Coan
Attorney, Agent, or Firm—Hill, Van Santen, Steadman & Simpson

[57] ABSTRACT

Accumulator and stacker for sandwiched cookies, biscuits and like articles in which two side-by-side rows of sandwiched cookies are delivered from a conventional sandwiching machine and stacked one sandwich on top of another sandwich in an adjacent row and then accumulated into individual two high stacks with the stacks in tandem groups of two, three, four or more stacks at the in-feed conveyor of a conventional horizontal wrapping machine. The sandwiched cookies may be round, square and elongated rectangular cookies or of various similar shapes. The accumulator is between the discharge end of the sandwiching machine and the intake end of a wrapping machine, and provides a continuous high speed stacker supplying pre-selected stacked groups of sandwiches to the infeed conveyor of the wrapping machine in a continuous path. The transitions from the sandwiching machine to the stacker and accumulator and the stacking and accumulating and feeding of the accumulated groups to the wrapping machine are smooth and gradual, making it possible to handle rectangular cookies in a cross-wise orientation without crumbling of the cookies or other damage thereto. This is all attained by a series of overhead conveyors cooperating with the sandwiching machine and wrapping machine conveyor and upwardly inclined and declining conveyor troughs for each row of sandwiches, elevating one row of sandwiches and diverting this row over a next adjacent row and lowering this row on top of the next adjacent row of sandwiches and moving the sandwiches out of the paths of the accelerating conveyor flights as picked up by other conveyor flights, making it possible to have final production rates of 300 or more packages per minute with no damage to the cookies because of this high speed operation.

19 Claims, 11 Drawing Figures

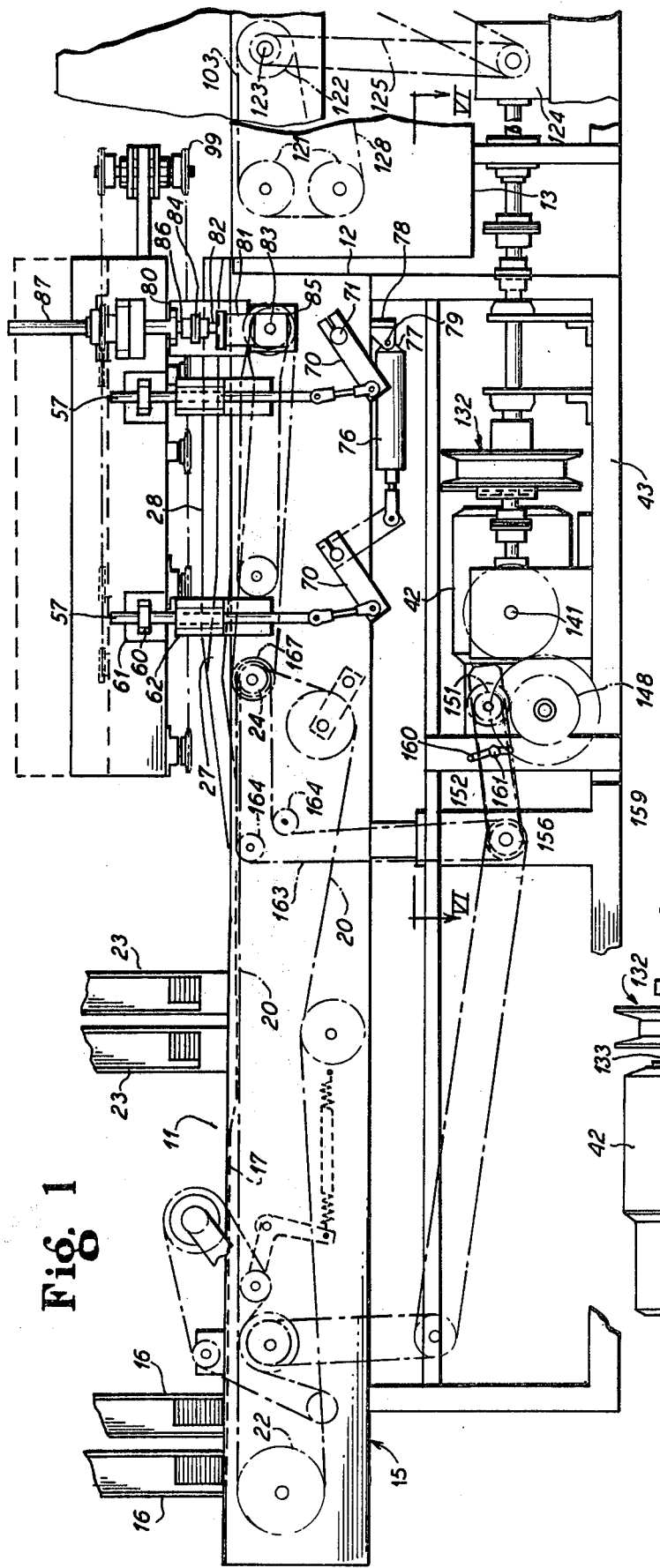
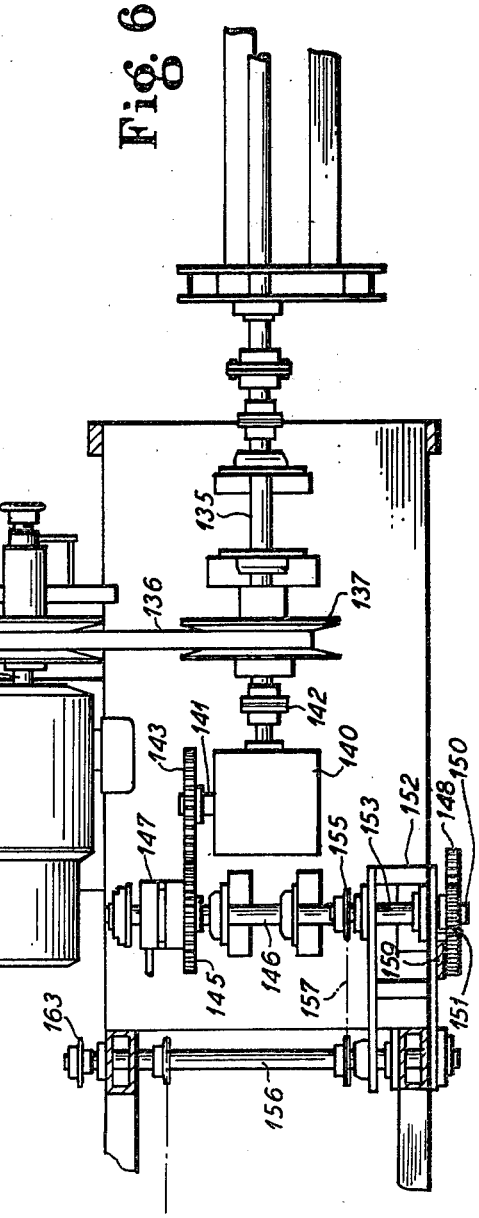
Fig. 1
Fig. 6

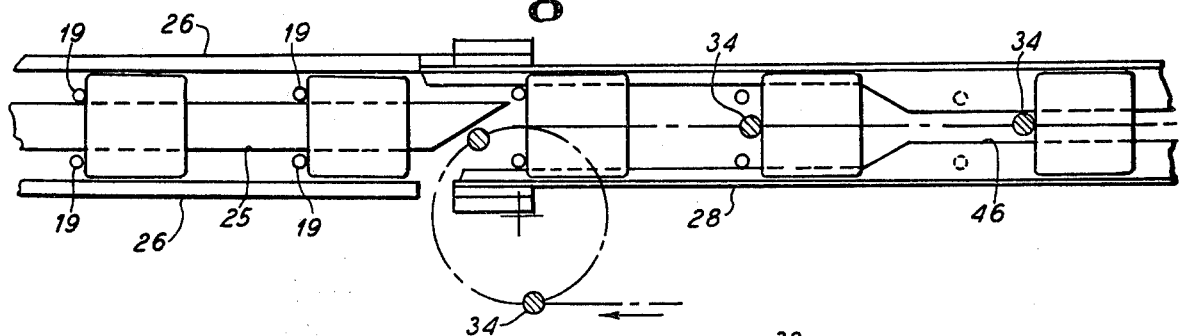
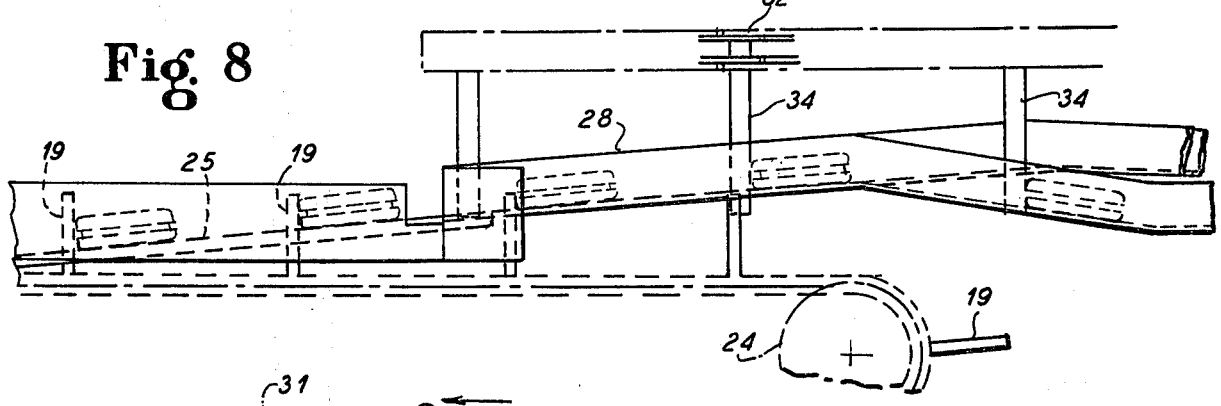
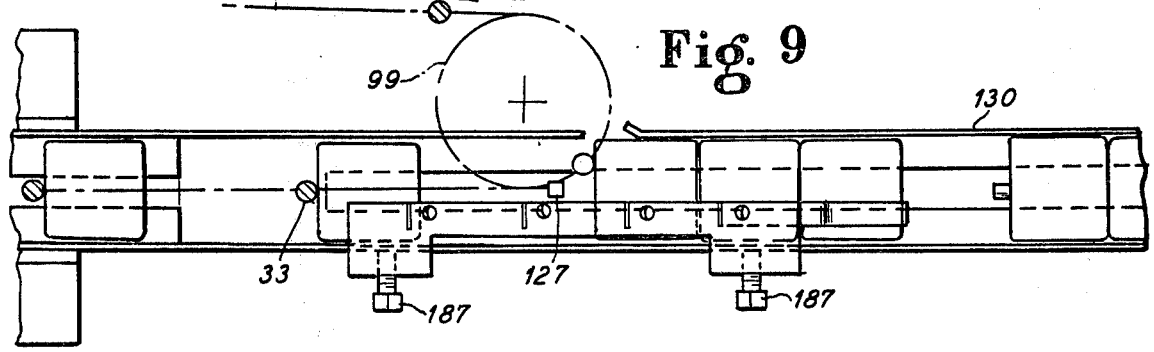
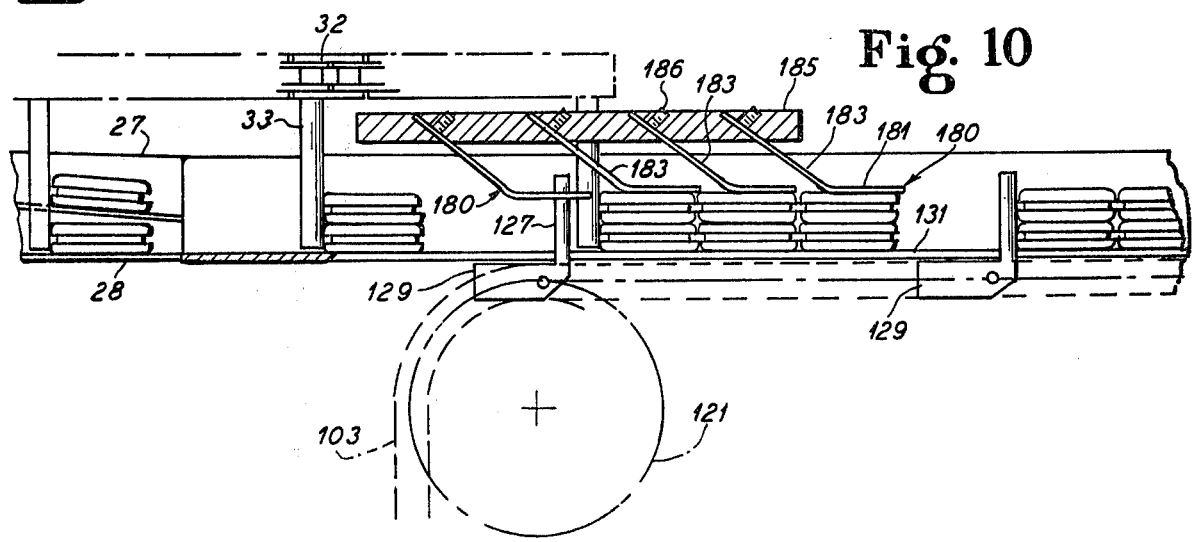

ACCUMULATOR AND STACKER FOR SANDWICHED BISCUITS AND THE LIKE

BACKGROUND OF THE INVENTION

Previously sandwiched cookies have been wrapped by intermittently operating wrapping machines, because of the intermittent supply of sandwiched cookies to the wrapping machine. This intermittent wrapping operation has made production rates relatively low and never exceeding 100 packages of stacked tandemly grouped cookies per minute.

The present operation of stacking and accumulating the groups for packaging is a continuous operation and takes the sandwiched cookies from a conventional two-row sandwiching machine such as is shown and described in the U.S. Pat. to Fay No. 3,119,352, which issued in May of 1960, and utilizes a series of overhead conveyors cooperating with the sandwiching machine conveyors and the wrapping machine conveyor.

This is further attained by elevating conveyor troughs as they extend from the sandwiching machine and bringing depending flights of overhead conveyors between the flights of the sandwiching machine conveyors and travelling at higher rates of speed than the sandwiching machine conveyors and taking at least one row of sandwiches and crossing over the next adjacent row of sandwiches and depositing one sandwich on top of another sandwich, and driving all of the conveyors in preselected synchronization relative to each other to assure the flights move out of the line of travel of the cookies as they decelerate and carrying the sandwiches along the constant speed runs of the conveyor flights.

SUMMARY OF THE INVENTION

Stacker and accumulator stacking the sandwiched cookies of adjacent rows of sandwiched cookies delivered from the sandwiching machine one on top of the other as they approach the wrapper and accumulating the stacked sandwiches into groups of two, three or more stacks along the wrapper and delivering these stacks in tandem at the wrapper forming a continuation and part of the stacker.

This is attained by elevating both rows of sandwiched cookies as they leave the sandwiching machine along inclined troughs moving the sandwiched cookies out of the paths of the vertical pusher pins or flights of the sandwiching machine conveyors, as they change their directions around their drive sprockets, and lowering one row of sandwiched cookies to accommodate the other row to be brought over and along the one row.

Right and left hand overhead conveyors having depending pusher pins or flights move between the pins of the sandwiching machine flights along slots in the centers of the troughs of the stacker and travel at higher rates of speed than the speed of the sandwiching machine conveyor pusher pins. The overhead conveyors travel in horizontal planes and the flights thereof pass into and out of the respective side walls of the troughs extending from the sandwiching machine through slots in the side walls of the troughs and drop the left hand sandwiched cookies on top of the right hand sandwiched cookies as they approach the wrapper. An underneath conveyor comes along to pick up a right hand row of sandwiched cookies and convey this row of sandwiched cookies to a stacking station. This underneath conveyor moves out of the paths of the lower or right hand cookies, prior to accelerating around the direction changing sprockets therefor, and accommodates the depending flights or pusher pins of a left hand overhead conveyor to move the left lane sandwich to the right at a diagonal as the right lane sandwich arrives at the point of intersection of the right and left lanes slightly sooner than the left lane sandwich. This assures that the depending overhead pusher pins or flights which project downwardly through both upper and lower sandwich levels will enter the right lane behind a right lane sandwich, and will then take over the pushing of the right lane sandwich, as intermediate upwardly projecting transfer pins of the stacker conveyor recede along a declining track. The top sandwich then drops onto the bottom sandwich at the wrapper and its travel is continued along the wrapper intake conveyor as pushed by the overhead transfer pin.

The accumulation of the two high stacks in tandem takes place on the wrapping machine intake conveyor as each overhead transfer pin passes over the wrapper intake conveyor and carries the two high stacks and pushes the preceding stack ahead of it. The flights of the wrapper conveyor are spaced apart a greater distance than the accumulated stacks of sandwiched cookies and pick up the accumulated stacks as the overhead conveyor leaves the stacks and carries the stacks for accumulation and wrapping. The spacing of these flights may be varied in accordance with the number of stacked groups to be wrapped in tandem.

A single electric motor drives the sandwich machine, the stacker accumulator machine, and the wrapper, all in synchronization, through a variable speed pulley system so that the output production speed can be varied to match the output rate of the baking oven.

A change gear mechanism to easily change gear ratios is provided. The change in gear ratios provides for a change in the relationship between the stacker output relative to the wrapper accumulating input. This creates groups having the required numbers of stacks.

All of the conveyors for the accumulator, stacker and wrapper are driven through adjustable couplings to accommodate the proper timing of the conveyors relative to each other and to thereby make it possible to drive the entire line in synchronization.

An advantage and object of the invention is to so arrange the pusher pins of the conveyors moving the sandwiches through the stacking and accumulating stages with an accelerating and decelerating motion, accelerating as they pass around their direction changing sprockets out of the way of the cookies and decelerating as they come into engagement with the cookies, resulting in more gentle handling and transfer of the fragile sandwiches with little if any danger of physical damage to the sandwiches.

A further advantage of this invention is that the vertically movable overhead conveyor structure provides ease of cleaning of the conveyors and troughs to remove any build-up of the sticky sandwich filling on the guide rails of the troughs and supports that would otherwise adversely affect the high speed operation of the accumulator and stacker.

A further advantage of the invention is that because of the smooth and gradual transitions in the stacking procedure, it is possible to handle rectangular shaped cookies in a crosswise orientation, which is a common style of package arrangement in many parts of the world.

A further object and advantage of the invention is the incorporation of the stacker between the discharge end of the sandwiching machine and the receiving end of a continuous wrapping machine and stacking on the wrapping machine to enable wrapping in a continuous operation at a relatively high rate of speed.

A still further object and advantage of the invention is to stack at least two high stacks of sandwiched cookies on the wrapping machine intake conveyor, by the overhead pusher pin of one transfer conveyor passing over the intake of the wrapping machine, and carrying the two-high stack and pushing the preceding stack ahead of it as the pusher pin moves away from the stack through a slot in the side wall of the conveyor trough.

A further advantage of the invention is the provision of a single motor for driving the sandwiching machine, the stacker, accumulator and wrapping machine at input speed ratios attained by utilizing the proper sprocket ratio for any given wrapper, and enabling the entire line to be driven in synchronization.

These and other objects and advantages of the invention will appear from time to time as the following specification proceeds and with reference to the accompanying drawings wherein:

FIG. 1 is a side elevational view diagrammatically illustrating the stacker and accumulator at the discharge end portion of a sandwiching machine and the intake end of a wrapping machine and the drive mechanism therefor.

FIG. 2 is a diagrammatic plan view illustrating the converging troughing arrangement for stacking the sandwiched cookies one on top of the other at the wrapper, and the paths of the overhead conveyors in which the left hand conveyor crosses over to the right and intersects the right line of travel and brings the left hand line of cookies over the right-hand line of cookies to effect stacking of the sandwiched cookies delivered from the sandwiching machine at the wrapper, one on top of the other to be picked up by the wrapping machine conveyor.

FIG. 6 is a sectional view taken substantially along line VI—VI of FIG. 1 and illustrating the drive to the sandwiching machine, the wrapping machine and the accumulator and stacker of the present invention.

FIG. 7 is a fragmentary generally diagrammatic plan view of the right hand lane of the stacker showing a depending overhead conveyor flight movable behind a sandwich and taking the sandwich away from the flights of the sandwiching machine as the sandwiching machine flights terminate beneath the right hand upwardly inclined trough for the stacker.

FIG. 8 is a diagrammatic side elevational view illustrating the troughing arrangement for elevating the sandwiches out of the path of the sandwiching machine conveyor and then lowering the sandwiches to accommodate the stacking of the sandwiches in the left hand lane thereon.

FIG. 9 is a diagrammatic plan view of the discharge end of the stacker and showing a flight passing out of the slot of the trough for the stacked sandwiches, and also illustrating a wrapping machine flight catching up with a tandem group of sandwiches and pushing these sandwiches in tandem for wrapping by the wrapping machine.

FIG. 10 is a generally diagrammatic view in side elevation of the tandemly arranged stacked cookies passing to the wrapper and illustrating the hold-down means for the stacked cookies as well as the in by end of the wrapping machine conveyor.

DESCRIPTION OF PREFERRED EMBODIMENTS

Figure 2:
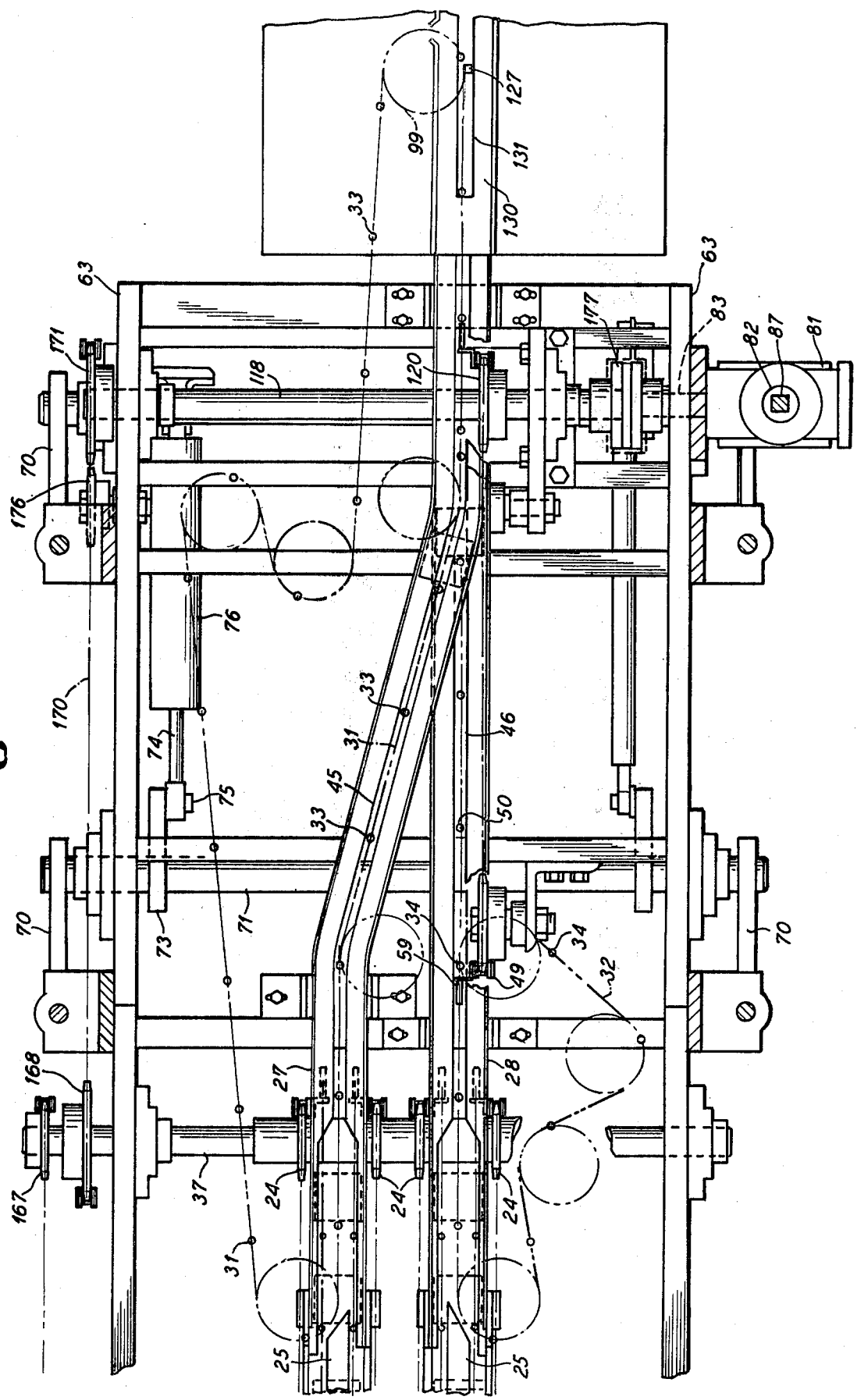

In the partial diagrammatic showing of the invention illustrated in FIGS. 1 and 2, I have shown a sandwiching machine 11, delivering two rows of sandwiched cookies in side by side relation with respect to each other, which may be in the order of 1600 cookies per minute, directly to a stacker and accumulator 12, which stacks the two rows of sandwiched cookies delivered from the sandwiching machine into one row, with the sandwiches of one row stacked on top of the other, where they are accumulated in tandem as they enter a wrapper 13 and are carried by the wrapper conveyor in tandem groups of one or more stacks of cookies. The sandwiching machine 11 may be like that shown and described in the U.S. Pat. to Fay No. 3,119,352, incorporated herein as a part hereof.

The sandwiching machine 11 generally includes a main frame 15 and magazines 16, 16 which deposit cookies design-side down on parallel spaced taut wires 17. The cookies are carried along said wires by upstanding pins or flights 19 extending upwardly of certain links of endless chains 20 of a conveyor 21.

The sandwiches are formed by the deposit of cookies or biscuits on the wires 17 design-side-down by the side-by-side magazines 16, 16 and the application of creme to the plain sides of the cookies by a rotating creme applying valve 18 spaced in advance of the magazines 16, 16. The cookies with creme thereon are then carried along the wires 17 by the flights 19 of the endless conveyor chains 21 beneath magazines 23, which deposit cookies or biscuits design side up onto the cremed cookies. The sandwiched cookies may then be passed under a pressure shoe (not shown) for each line of cookies, exerting pressure on the sandwiched cookies to be carried along plates 25 of the conveyors.

The sandwiched cookies are carried in right and left hand lanes by the parallel conveyors and are delivered in side-by-side relation relative to each other at relatively high rates of speed, along the plates 25 extending in advance of the wires 17 and between the upstanding pins 19 to upwardly inclined troughs 27 and 28 of the stacker 12.

It should here be understood that when referring to the right and left hand lanes, the trough 27 forms a continuation of the left hand lane while the trough 28 forms a continuation of the right hand lane, assuming the sandwiching machine and stacker are looked at towards the entering end of the sandwiching machine.

Figure 3:
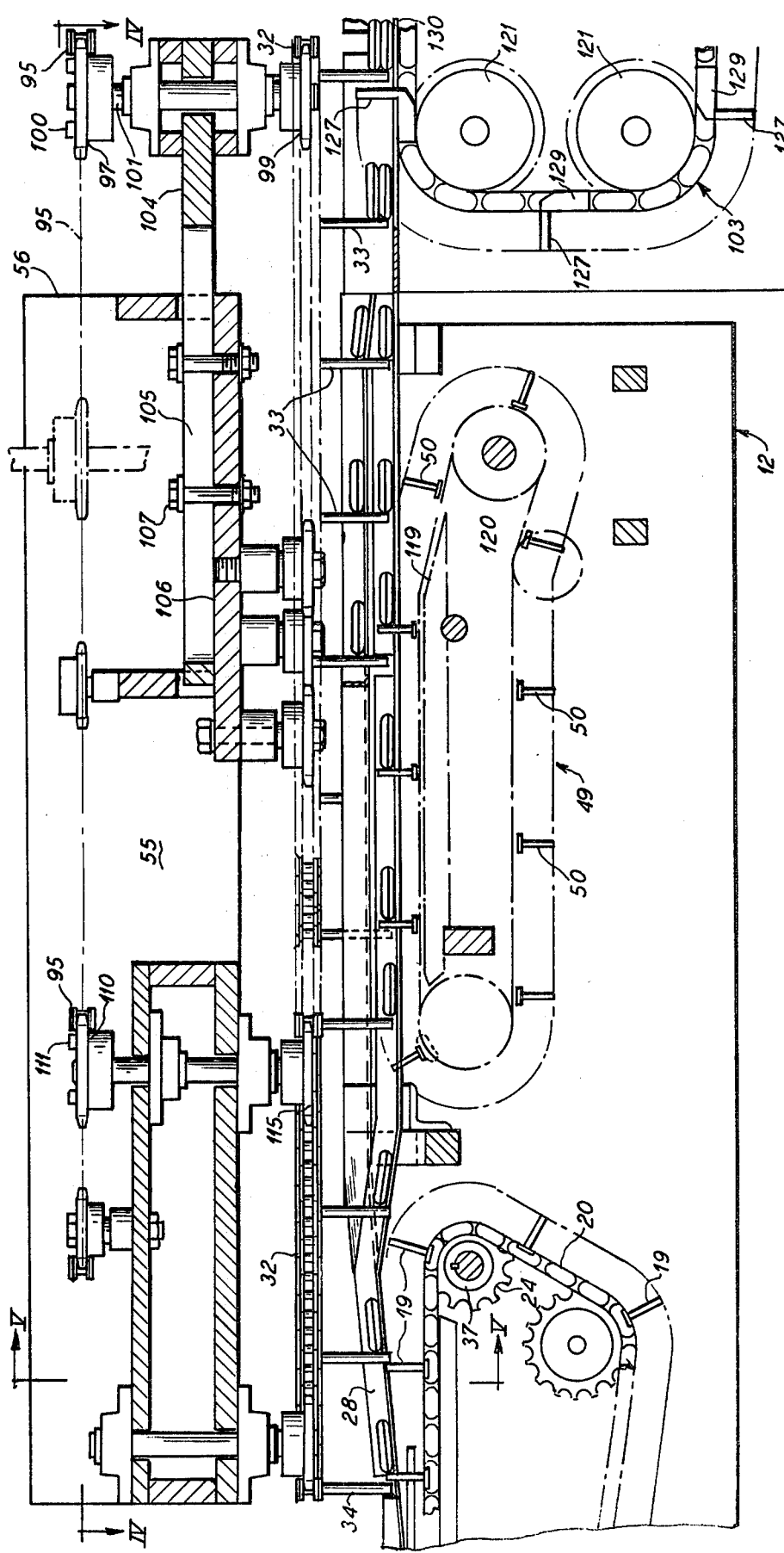
FIG. 3 is a sectional view taken substantially along line III—III of FIG. 2 and diagrammatically illustrating the overhead conveyors extending along the stacker and wrapper in side elevation.
Figure 11:
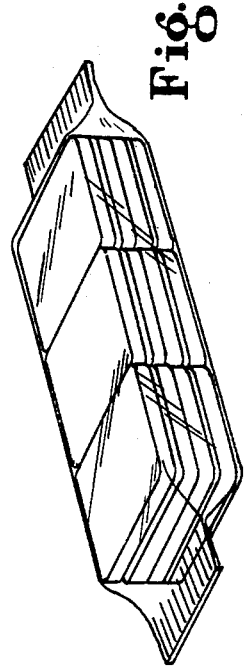
FIG. 11 is a perspective view showing a tandemly arranged group of three two high sandwiches as wrapped by the wrapper.

As shown in FIGS. 2 and 3, the conveyors 21 include four parallel endless chains 20 turning about direction changing sprockets 22 at the entering end of the conveyor and about drive sprockets 24 at the discharge or out-by end of the conveyor. The wires 17 are maintained taut between each set of endless chains and the plates 25 forming continuations of the said wires have retainer walls 26 extending along the outer sides thereof to retain the sandwiches to said plates to be carried along by the flights 19 and be picked up by depending pins 33 depending from a horizontal conveyor 31 and passing along the trough 27 and depending pins 34 depending from the conveyor 32 and passing along the trough 28 as will hereinafter more clearly appear as this specification proceeds.

The trough 27 forms a continuation of the left hand lane of travel of the cookies and is shown in FIGS. 1 and 2 as inclined upwardly to an elevation above the trough 28 and then crossing over in an angular direction as shown in FIG. 2 in alignment with and just above the top of the trough 28.

The trough 27 may be in the form of two parallel spaced angle irons having a slot 45 therebetween and extending therealong for the length thereof. The trough 28 is of a similar construction and has a slot 46 extending for the length thereof. The slots 45 and 46 receive the depending pusher pins 33 and 34 of the respective overhead conveyors 31 and 32 for taking the cookies as they leave the sandwiching machine conveyor and catching up with the cookies during the transition point as leaving the sandwiching machine conveyors to a stacker conveyor 49 disposed beneath said troughs and having upright pusher pins 50 movable along the slots 46 of the trough 28, to pick up the sandwiches as the depending flights of the overhead conveyor 32 leave the trough 28 through the side wall thereof as said trough declines, as shown in FIG. 3.

The overhead conveyors are mounted at the bottom of a frame structure 55 vertically movable relative to the troughs 27 and 28 to enable the cleaning of said troughs and the overhead conveyors from the accumulation of creme.

As shown, in FIGS. 1 and 2 the frame structure 55 has parallel side walls 56 having mountings thereon for elevating rods 57 secured to said side walls as by collars 59 fitting in slots 60 of bracket plates 61. The rods 57 are slidably guided in guides 62 secured to opposite sides 63 of the frame structure for the stacker 12. Each rod 57 has a clevis 64 of a link 65 transversely pivoted thereto. The opposite end of the link 65 has a clevis 69 thereon transversely pivoted to the end of an arm 70 suitably clamped to a transverse shaft 71 extending across the frame 63 for the stacker. A crank arm 73 is clamped to the shaft 71 and extends angularly downwardly of the arm 70 and is transversely pivoted to a piston rod 74 as by a pivot pin 75. The piston rod is extensible from a cylinder 76 having a piston therein (not shown).

It should here be noted that the structure for the two rods 57 and guides for the frame structure 55 for the overhead conveyors is the same on each side of said frame and that the right hand arm 70 is the same as the left hand arm but does not have a crank arm 73 depending therefrom. The shafts 71 further extend across the frame 63, to uniformly elevate the frame 55 relative to the frame 63.

The cylinder 76 has an ear 77 extending from its head end pivoted to a bracket 78 as by a transverse pivot pin 79.

The admission of fluid under pressure to the head end of the cylinder 76 will thus raise the overhead conveyors 31 and 32 and the drive mechanism therefor and thereby afford free access to said conveyors and the troughs 27 and 28 for cleaning. The overhead conveyors are lowered by the admission of fluid under pressure to the piston rod end of the cylinder to bring the piston (not shown) into abutting engagement with the bottom of the cylinder 76. A housing 81 is secured to the outer side of the side plate 63 and forms a bearing housing for a vertical shaft 82.

Figure 4:
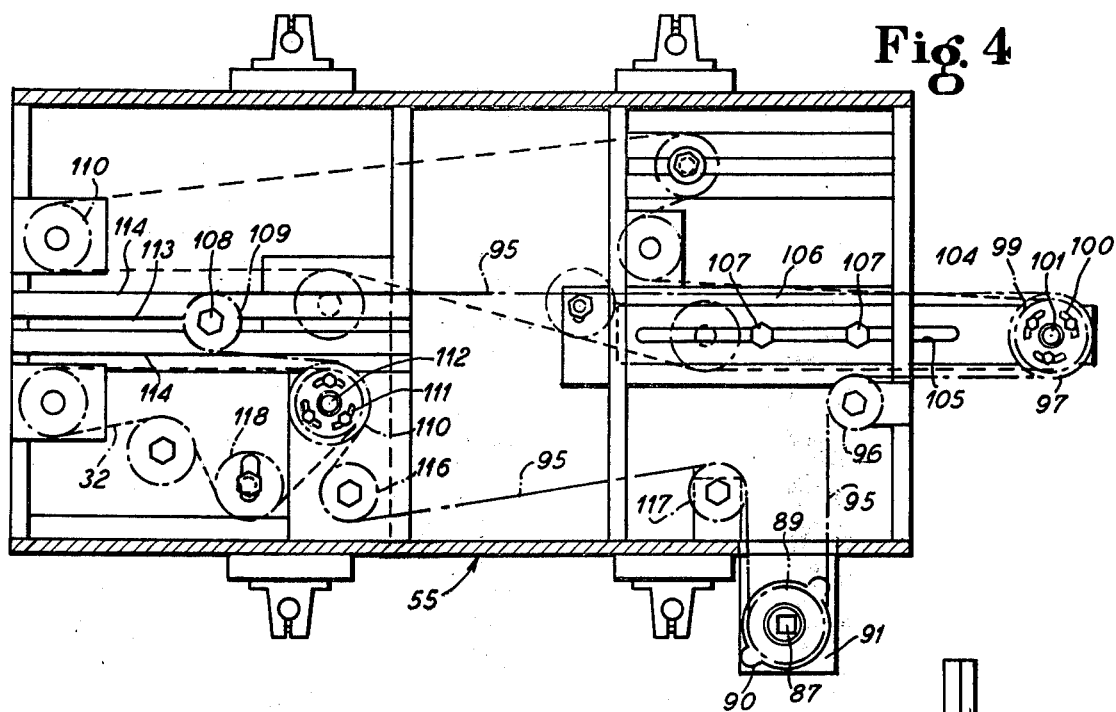
FIG. 4 is a diagrammatic partial sectional plan view of the overhead conveyors and the drive therefor, taken substantially along the line IV—IV of FIG. 3.
Figure 5:
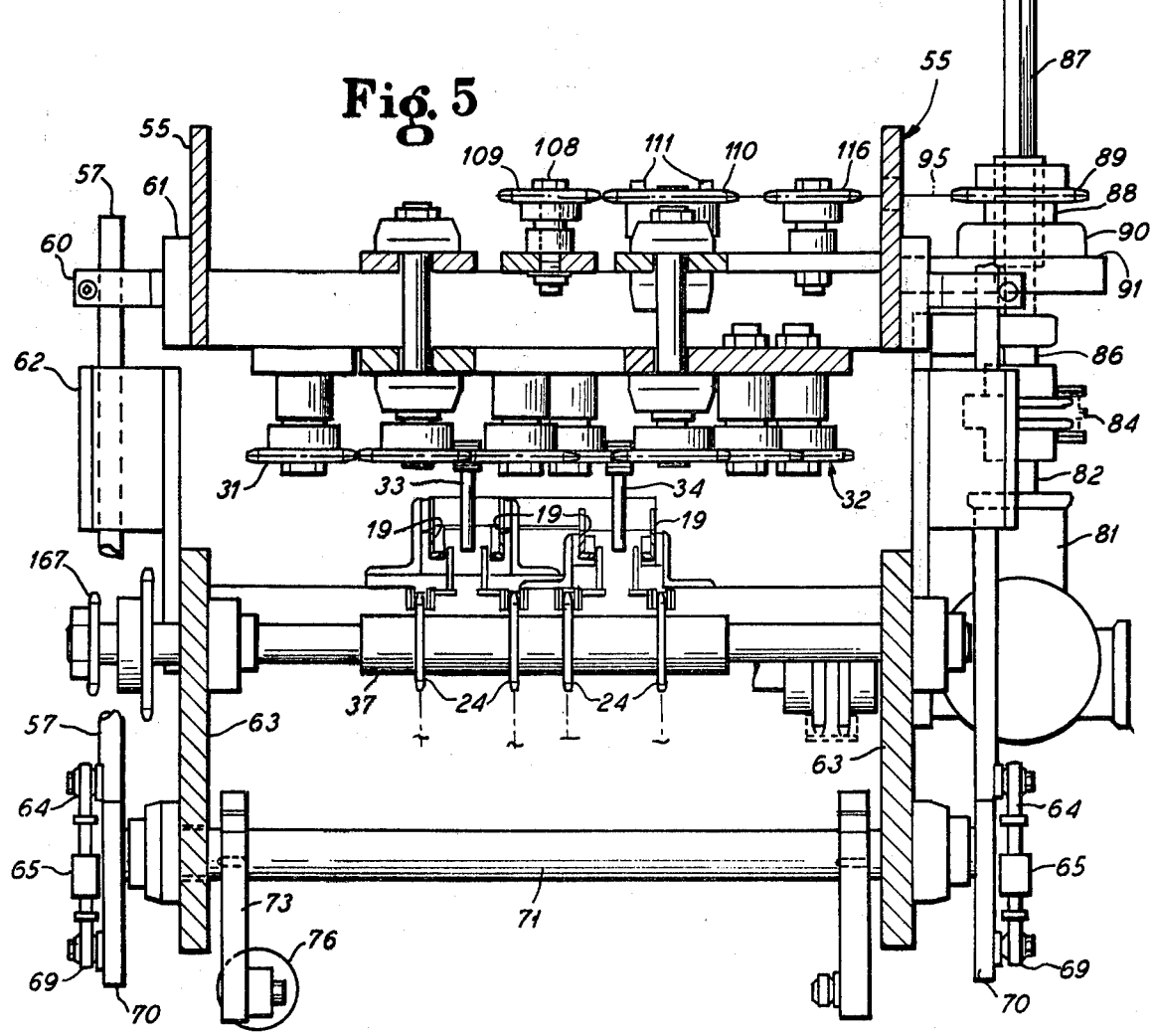
FIG. 5 is a partial fragmentary transverse sectional view taken substantially along V—V of FIG. 3, and illustrating the sandwiching machine conveyors in section and the overhead conveyors with their depending flights movable between the flights of the sandwiching machine conveyors.

The shaft 82 is driven from a transverse shaft 83 through right angled drive gearing (not shown) housed in the gear housing 81. The right angled drive gearing may be mitre gearing or other suitable gearing and is not shown or described further since it forms no part of the present invention. The shaft 82 may be coupled to a coaxial shaft 86 by a coupling 84, and has a squared upper end portion 87 which may slidably extend through a hub 88 of a drive sprocket 89, journalled in a bearing support housing 90. Said bearing housing extends upwardly of a top plate 91 extending laterally of the vertically movable frame structure 55 for the overhead conveyors 31 and 32 and drive mechanism therefor (FIGS. 4 and 5).

The drive sprocket 89 meshes with and drives an endless chain 95 extending along the top of the frame structure 55 and driving the two overhead conveyors 31 and 32 from above said conveyors. The incoming run of the endless chain 95 extends inwardly of the drive sprocket 89 about an idler 96 and outwardly therefrom towards the wrapper 13 about a drive sprocket 97 driving a coaxial nose sprocket 99 for the overhead conveyor 31 as shown in FIGS. 1 and 3. The drive from the sprocket 97 to the coaxial nose sprocket 99 is through an adjustable coupling 100 and vertical shaft 101 (FIG. 4). The coupling 100 may be of a conventional form to enable the conveyor 31 to be synchronized with the conveyor 32 and a conveyor 103 of the wrapping machine 13.

The shaft 101 and bearing support means thereof is mounted on the end of an adjustable plate 104 having a slot 105 extending therealong and adjustably secured to the top side of a frame member 106 of the frame 55 by nuts and bolts 107 extending through said slot and frame member to enable the position of said sprocket to be varied in accordance with the wrapper conveyor 103.

From the sprocket 97 the drive chains extends about a take-up sprocket 109. The take-up sprocket 109 is journalled on a vertical shaft 108 in the form of a bolt mounted for adjustable movement along a slot 113 formed by spaced top plates or rails 114 of the frame structure 55. A nut threaded on said slot beneath said rails holds said sprocket in position and the drive chain 95 under the proper tension.

The drive chain extends from the take up sprocket 109 to and about a sprocket 110, for driving the overhead conveyor 32 through an adjustable coupling 111. The coupling 111 has driving connection with a vertical shaft 112 having a drive sprocket 115 on the lower end thereof and forming a means for driving the right hand overhead conveyor 32, and enables said conveyor to be driven in the proper timed relation with respect to the conveyor 31, and with respect to the drive for the sandwiching machine conveyors 21 and the wrapping machine conveyor 103.

A conventional take up sprocket 118 is provided in the chain for the conveyor 32 (FIG. 4) to hold said conveyor under the proper tension.

From the sprocket 110 the chain 95 extends about an idler 116 and outwardly therefrom about an idler 117 and to and about the drive sprocket 89. The drive to the conveyors 31 and 32 is thus from above the frame structure 55 while the sprockets for driving said conveyors are spaced beneath said frame structure for ready access for cleaning.

In order to get the left side sandwich on top of a right side sandwich, the left overhead transfer conveyor 31 must cross over to the right and intersect the line of travel of the right hand conveyor (FIG. 2). To prevent interference between the two overhead conveyors, the transfer of the right side overhead conveyor must terminate prior to the point of intersection of the two conveyors and the transfer is attained by the intermediate stacker conveyor 49 and upstanding flights or pins 50 thereof (FIG. 3) which do not interfere with the left side transfer conveyor. The pusher pins of this conveyor contact the sandwich immediately after the overhead pusher pin of the conveyor 32 leaves the sandwich.

The upstanding pusher pins 50 of the intermediate conveyor may be spaced 4½ inches apart and may move slightly faster than the overhead pusher pins. The overhead pusher pins 31 moving the left lane sandwich to the right at a diagonal have a greater distance to travel than the right lane sandwiches. The right hand lane of sandwiches therefore will arrive at the point of intersection slightly sooner than the left lane of sandwiches. The overhead pusher pin 33 which project downwardly through both upper and lower sandwich levels will thus enter the right lane behind the right lane sandwich and will then take over the pushing of the right lane sandwich as the intermediate transfer pin 50 recedes beneath the right lane sandwich along a declining track 119 (FIG. 3) to its drive sprocket 120 on a drive shaft 118.

The top sandwich will then drop onto the bottom sandwich and will be progressed along the bottom side rails to the wrapper intake conveyor while still being pushed by the individual pusher pins 33 of the overhead conveyor 31.

The sandwiches will thus be stacked in two high stacks on the wrapper, and the accumulation of two high stacks will take place on the wrapping machine by the intake conveyor of the wrapping machine as each overhead pusher pin 33 is passing over the intake of the wrapper and carries a two high stack and pushes the preceding stack ahead of it (FIGS. 9 and 10).

The wrapper conveyor 103 extends about vertically spaced direction changing sprockets 121 adjacent the intake end of the wrapper, and turns about a sprocket 122 on a transverse shaft 196 spaced along the wrapper (FIG. 1). The shaft 123 is driven from right angled gearing, not shown in a gear box 124 through a chain and sprocket drive 125. The drive to the gear box and chain and sprocket drive will hereinafter be more clearly described as this specification proceeds.

The wrapper conveyor 103 is a chain type of conveyor and has one upstanding wrapper flight 127 for each package. The pitch or distance between the flights 127 is greater than the length of the accumulated number of stacks in a package. In order that the wrapper may have the ability to run groups having a different number of stacks, the apparatus is driven through a synchronizing mechanism, as will hereinafter more clearly appear as this specification proceeds.

The wrapper conveyor may be an endless chain type of conveyor and the upstanding flights 127 of the wrapper conveyor are secured to an endless chain 128 of the conveyor by attachments 129 extending rearwardly of said flights along the chain and beneath a trough 130 of the conveyor. The trough 130 has a slot 131 extending therealong along which the flights extend.

It may be seen from FIG. 9 that as the overhead conveyor 31 and depending pins or flights 33 thereof turn about the nose sprocket 99, and pass through a slot in the side wall of the conveyor trough, that each pin is passing along the stack of sandwiches and thus leaves the stack in a decelerating path as the stack is picked up by a flight 127 of the wrapper conveyor. This assures a smooth transition from the overhead conveyor to the wrapper conveyor and avoids damage to the cookies by the flights 33 and 127.

Referring now to FIGS. 1 and 6 and the drive to the sandwiching machine 11, the stacker 12 and the wrapper 13 accumulating the stacked sandwiches in tandem groups, the motor 42 is shown in FIGS. 1 and 6 as mounted on a laterally offset portion of the base 43 for the stacker. A variable speed drive 132, shown as being a Reeves drive, but which may be any other suitable variable speed drive is driven from a motor shaft 133 and drives a line shaft 135 through a belt 136 and pulley 137. The line shaft drives a speed reducer 140 from the end thereof opposite the end driving the wrapper, which is shown as being a right angled speed reducer of a conventional form which will provide the proper reduction to drive a drive shaft 141 of said speed reducer. The drive from the line shaft 135 to the speed reducer 140 includes a coupling 142.

A spur gear 143 on the shaft 141 meshes with and drives a spur gear 145 which drives a parallel shaft 146 through a single position disconnect clutch 147. A change speed gear 148 is keyed or otherwise secured to the end of the shaft 146 and held thereto as by a clamp nut 150. The change speed gear 148 is meshed with a gear 151 on a support arm 152 of a box-like form, forming bearing supports for a shaft 153. A sprocket 155 is keyed or otherwise secured to the inner end of said shaft and driven therefrom. Said sprocket 155 drives a shaft 156 of the sandwiching machine through a chain and sprocket drive 157.

The box-like arm 152 is pivotally mounted on the shaft 156 to permit changing of the chain speed gear 148 where it may be desired to synchronize the sandwiching machine with the wrapping machine or change the number of stacked sandwiches in tandem groups for wrapping.

The arm 152 extends along the inner side of an upright strip 159 of a sandwiching machine frame. Said strip 159 has an arcuate slot 160 therein (FIG. 1) the arc of which is struck from the center of the shaft 156. A cap screw 161 or other securing device extends through the arcuate slot 160 and may be threaded in a wall of said arm, to hold said arm in position when the gear 151 is meshed with a required gear 148.

The drive to the sandwiching machine is like that shown in the U.S. Pat. to Fay, No. 3,119,352, so need not be described herein, except to point out that an endless chain 163 is driven from the shaft 156 and turns about direction changing sprockets 164 and extends forwardly therefrom to and about a drive sprocket 167 suitably secured to the outer end of the drive shaft 37, for driving said shaft and the sprockets 24, driving the endless chains 20 of the conveyors 21 to convey the sandwiches to the stacker, to be carried along the stacker by the left and right hand overhead conveyors 31 and 32 in cooperation with the stacker conveyor 49.

The drive to the sandwiching machine shown is a typical drive to the sandwiching conveyors and to the wrapper. Different wrapper manufacturers require different input speed ratios which may be in the order of 1, 2, 4, 5 or 6 per package. By supplying the proper gear ratio for any given wrapper the entire line can be driven in synchronization.

The drive to the stacker conveyor 49 is through a sprocket 168 keyed or otherwise secured to the shaft 37 inwardly of the drive sprocket 167.

An endless chain 170 meshes with said drive sprocket 168 and is driven therefrom and has driving engagement with a sprocket 171 on a transverse shaft 118, having a drive sprocket 120 keyed or otherwise secured thereto. A take-up idler 176 for the endless chain 170 is provided to maintain the proper tension on said chain.

Spaced along the receiving end of the wrapper are a series of resilient hold downs 180 are spaced in alignment with each other and engage the top sandwich of the stacked sandwiches as they are accumulated at the wrapper and progressed therealong by the flights 33 and then the upstanding flights 127 of the wrapper conveyor which arranges the sandwiches in tandem. Said resilient hold downs 180 have flat sandwiching engaging surfaces 181 extending from angularly extending arms 183. The upper ends of said angular arms 183 extend within slots in a bar 185 and are secured thereto as by set screws 186.

The bar 185 is supported on top of the trough 130 and extends downwardly along the outer side of a side wall thereof and is clamped thereto as by clamp screws 187.

I claim:

1. In a sandwiching machine and wrapping machine spaced in advance of the sandwiching machine a stacker cooperating with the sandwiching machine to stack sandwiches delivered therefrom and cooperating with the wrapping machine to effect the accumulation of stacked sandwiches into two, three, or four stacks in tandem arrangement relative to each other to thereafter be wrapped by the wrapping machine, two side by side sandwiching carrying conveyor troughs extending from the sandwiching machine over the wrapper and carrying sandwiches for stacking and having flight receiving slots extending therealong, a first trough for one row of sandwiches declining to substantially the plane of the top of the wrapping machine and having a first conveyor extending therealong and a second trough for the other row of sandwiches having a second conveyor and extending parallel to the first trough for the one row of sandwiches and angularly toward the trough for the one row of sandwiches and therealong to intersect the line of travel of the one row of sandwiches, the sandwiches in each trough being carried by the flights of said second conveyor and carried therealong as the flights recede beneath the bottom of its trough and the flights depending from the intersecting trough carry the sandwiches in both troughs in aligned relation for stacking said second trough extending along a wrapper conveyor for a portion of the length thereof and constructed to enable the depending flights to pass outwardly out said second trough beyond a sidewall thereof to a return path of said flights, and disengage the sandwiches in a decelerating path as the flights move outwardly of the sidewall of said second trough, to avoid crumbling of the trailing edges of the sandwiches as said flights move out of engagement therewith.

2. The apparatus of claim 1 wherein a trough extends along the wrapper and has a slot extending therealong and a wrapper conveyor having flights extending through said slot continues the progress of the stacked sandwiches for accumulation on the wrapper as said conveyor extending along said intersecting through passes along the wrapper.

3. The accumulator and stacker of claim 2 in which the trough extending along the wrapper has a slot therein in the side wall thereof to accomodate the flights movable along said trough to pass angularly therethrough out of the path of the flights of the wrapper conveyor with a decelerating motion.

4. The apparatus of claim 3 in which the second overhead conveyor passes about a nose sprocket the pitch line of which is in alignment with said slot to effect movement of the flights of said second overhead conveyor along the sandwiches in a decelerating path and out of the way of the flights of said wrapping machine conveyor, stacking the sandwiches in preselected groups in accordance with the spacing of the flights of said conveyor.

5. The apparatus of claim 1 in which said overhead conveyors are mounted on the underside of a vertically movable frame structure, and means are provided to support said frame structure in position, and other means are provided to elevate said frame structure to accomodate cleaning of said conveyors.

6. The apparatus of claim 4 in which a single drive motor is provided for all of said conveyors and means are provided in the drive to each conveyor to accomodate synchronization of travel thereof.

7. The apparatus of claim 6 in which the drive from said motor to said overhead conveyors comprises a slidable drive connection accommodating driving of said conveyors in various positions of said overhead conveyors.

8. The apparatus of claim 7 in which the slidable drive connection includes a sprocket movable about a vertical axis and a squared shaft coaxial with the axis of said sprocket and accommodating adjustable movement of said sprocket therealong.

9. The apparatus of claim 8 in which the drive to the second overhead conveyor comprises a nose sprocket extending over the wrapper and an adjustable mounting for said nose sprocket accommodating said nose sprocket to be moved along the wrapper in accordance with the group of sandwiches stacked and the type of wrapper used.

10. The apparatus of claim 9 in which the drive to the first overhead conveyor is from the drive chain driving the second overhead conveyor.

11. The apparatus of claim 7 in which said stacker has a base, a motor is mounted on said base, and variable speed drive connections are provided from said motor to the sandwiching machine, the underneath conveyors, the wrapper and the overhead conveyors of said sandwiching machine.

12. The apparatus of claim 7 in which the pusher pins of said conveyors move with an accelerating and a decelerating motion and decelerate as they engage a sandwich or stack of sandwiches and as they pass out of the paths of travel of the sandwiches.

13. The apparatus of claim 12 wherein the transitions for stacking and accumulating are smooth and gradual transistions, enabling rectangular shaped sandwiches to be handled without crumbling along the edges thereof and in a cross-wise orientation.

14. In combination with a sandwiching machine and wrapper accumulating biscuits in pre-selected groups, the improvement comprising a stacker at the discharge end of the sandwiching machine and the receiving end of the wrapper and cooperating with the sandwiching machine and wrapper to effect the stacking of sandwiches as delivered from the sandwiching machine and accumulating the stacked sandwiches into two, three, four or more stacks in tandem arrangement relative to each other in cooperation with the wrapper at the entering end of the wrapper, two side-by-side conveyor troughs extending from the sandwiching machine in alignment with the discharge path of travel of biscuits sandwiched in the sandwiching machine, said side-by-side conveyor troughs each having slots in the bottoms thereof and extending therealong, each trough being inclined upwardly as it leaves the sandwiching machine and then declining, a first trough extending angularly towards a second trough and terminating in alignment with and above the second trough, individual overhead conveyors for each trough having depending flights for pushing sandwiches along said troughs, the overhead conveyor for a first trough terminating prior to intersection of said troughs, and a stacker conveyor beneath said second trough and having flights extending upwardly through the slot extending along the second trough, and continuing motion of the sandwich to a position adjacent the point of intersection of said first trough with said second trough, to accommodate the conveyor movable along said second trough to carry the sandwiches along each trough and stack one on top of the other at the end of said first trough, for accumulation into groups for wrapping.

15. The apparatus of claim 14 wherein the wrapper has a conveyor extending therealong having upright flights and taking the stacked sandwiches and accumulating the sandwiches into preselected groups.

16. The apparatus of claim 15 wherein the flights of the conveyor for the wrapper are spaced apart a greater distance than the groups of sandwiches to be accumulated, a single motor is provided to drive the sandwiching machine, stacker, accumulator and wrapper, and change speed gearing is provided in the drive to the sandwiching machine, stacker and accumulator to vary the drive in accordance with the number of sandwiches to be stacked in tandem groups.

17. The apparatus of claim 16 wherein the drive from the motor also includes a variable speed drive.

18. The apparatus of claim 16 wherein the conveyors have flights extending vertically on their conveying runs and the flights of certain conveyors move away from the line of travel of the sandwiches with a decelerating motion.

19. The apparatus of claim 18 wherein the conveyors moving away from the line of travel of the sandwiches have depending flights so arranged as to cooperate with the conveyor troughs and have smooth and gradual transitions as they enter and leave the respective conveyor troughs.

* * * * *